United States Patent

Kazaoka et al.

[11] 4,067,533
[45] Jan. 10, 1978

[54] ADJUSTING SEAT SUPPORTING ASSEMBLIES FOR AUTOMOBILES

[75] Inventors: Kenichi Kazaoka, Nagoya; Masayuki Hayashi, Toyohashi, both of Japan

[73] Assignee: Aisin Seiki Kabushiki Kaisha, Kariya, Japan

[21] Appl. No.: 748,213

[22] Filed: Dec. 7, 1976

[30] Foreign Application Priority Data

Dec. 11, 1975 Japan .................................. 50-148236

[51] Int. Cl.² .......................................... F16M 11/24
[52] U.S. Cl. ....................................... 248/397; 297/328
[58] Field of Search ............... 248/397, 394, 396, 395; 297/328, 269, 270

[56] References Cited

U.S. PATENT DOCUMENTS

| 488,707 | 12/1892 | Cloutier | 297/328 |
| 2,594,882 | 4/1952 | De Rose | 248/394 |
| 2,609,029 | 9/1952 | Haberstump | 248/394 |
| 3,695,570 | 10/1972 | Ishida | 248/397 |
| 3,870,269 | 3/1975 | Werner | 248/394 |

FOREIGN PATENT DOCUMENTS 649,595 11/1962 Italy ..................................... 248/396

Primary Examiner—Francis K. Zugel
Attorney, Agent, or Firm—Finnegan, Henderson, Farabow & Garrett

[57] ABSTRACT

The automobile seat assembly is provided with a seat swingably mounted on the spaced longitudinal brackets. An assembly mounted on one of the brackets and adapted for adjusting the seat position includes a latch member pivoted to the seat and a detent fixed to the bracket. The latch member is provided with notches for engagement with the fixed detent and operatively connected to a manual handle lever. When the manual handle lever is operated, the latch member may be moved into and out of engagement with the fixed detent and rotated on the bracket so as to adjust the height of the seat position.

11 Claims, 11 Drawing Figures

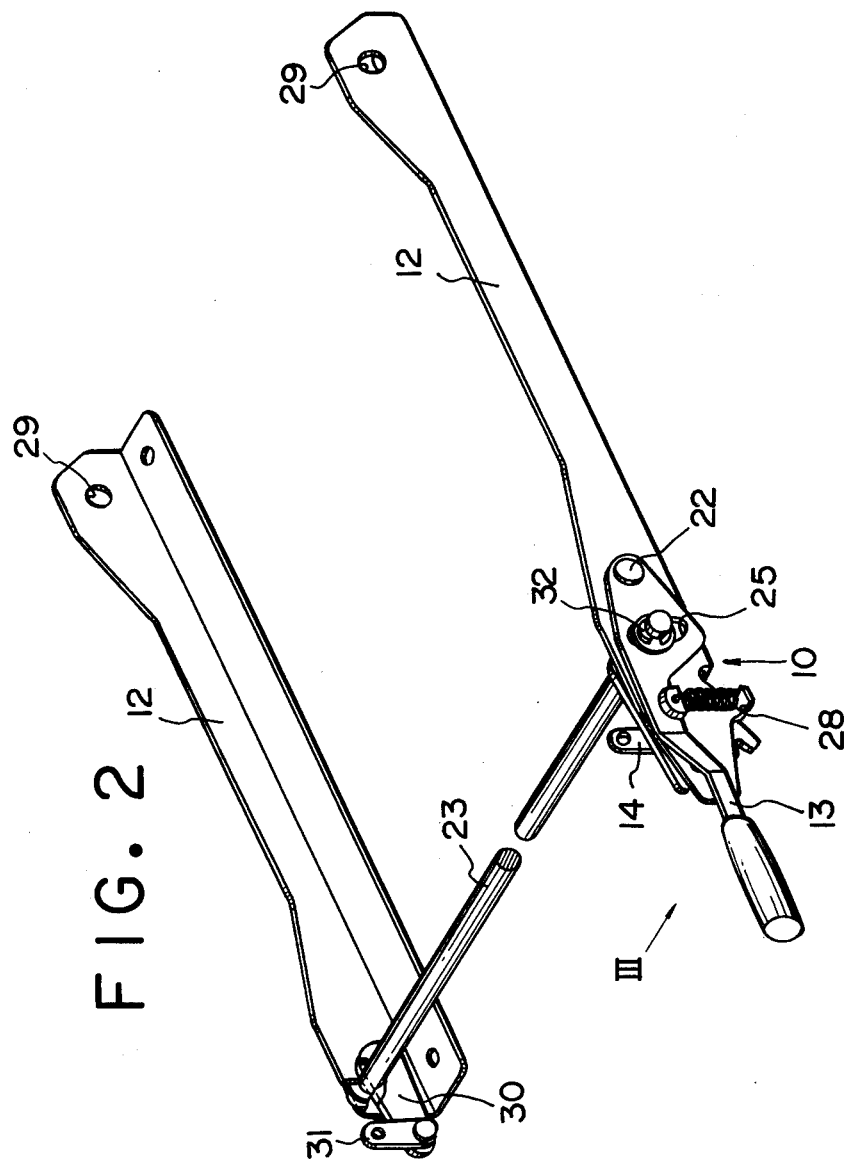

ic seat supporting assembly adapted for use in vehicles. More particularly, the present invention is concerned with the assembly for adjusting the position of an automobile seat by movement thereof relative to an automobile floor.

ADJUSTING SEAT SUPPORTING ASSEMBLIES FOR AUTOMOBILES

BACKGROUND OF THE INVENTION

The present invention relates to improvements in an adjustable seat supporting assembly adapted for use in vehicles. More particularly, the present invention is concerned with the assembly for adjusting the position of an automobile seat by movement thereof relative to an automobile floor.

In automobiles, it is a common practice to adjust the seat position with respect to the base floor. For this purpose there have been proposed a lot of adjusting assemblies such as disclosed in U.S. Pat. No. 3,669,398 issued on June 13, 1972 and U.K. Pat. No. 1,389,189 published on Apr. 3, 1975. Although these conventional assemblies are satisfactory as far as the primary purpose of adjustment and support of the seat position, they are complicated in structure and relatively large in size. More specifically, according to the conventional assemblies, a rotatable latch member provided with notches is pivotally mounted on the automobile set whilst a detent member adapted into and out of engagement with the latch member is pivotally mounted on the stationary bracket. The operation of a manual lever to which the detent is operatively connected causes the pivotal movement of the detent so as to bring the detent into or out of engagement with the latch member. Alternatively, the detent is slidably mounted on the bracket. The operation of the manual lever causes the detent to slide along an appropriate guide member, thereby to engage with or release from the latch member. In summary it is a conventional practice to rotate or slide the detent for engagement with the latch member by operation of the manual or handle lever. As a result, it is necessary to provide pivoting or slide - guiding means on the conventional assemblies so that the assembly is complicated as a whole and considerably high to be fitted in the limited space between the seat and the floor as evidenced in the aforementioned patents.

It is, accordingly, one of the objects of the present invention to provide an adjustable seat supporting assembly which may overcome the disadvantages in the conventional assemblies. According to the invention, it is unnecessary to provide the pivotable or slidable detent as in the prior arts. The operation of the manual lever may result in engagement of the latch member with the fixed detent as well as in the rotation thereof for adjusting the seat position. The assembly of the invention is, therefore, simple in construction and very easy to fit within the limited space of the seat assembly.

BRIEF DESCRIPTION OF THE DRAWINGS

FIG. 2 is a perspective view of a first embodiment of this invention;

DETAILED EXPLANATION OF THE INVENTION

Figure 1:
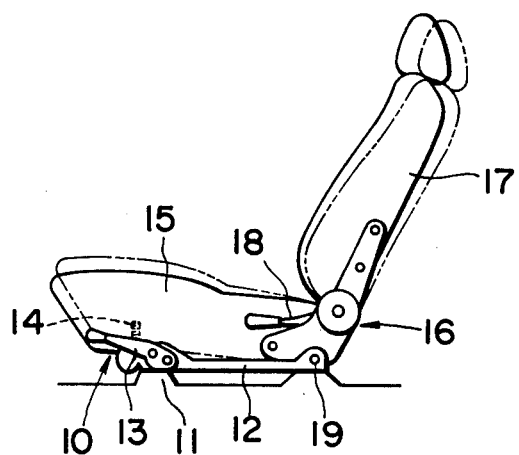
FIG. 1 is a side view of an automobile seat assembly provided with an adjustable seat support assembly in accordance with this invention.
Figure 3:
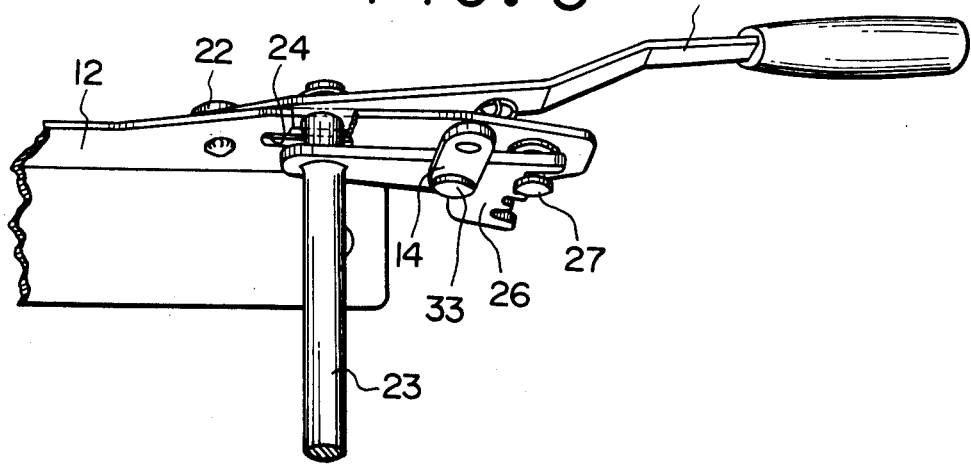
FIG. 3 is a view similar to FIG. 2 and seen from the direction of the arrow III.

Referring first to FIG. 1 of the drawings, an adjustable seat supporting assembly generally indicated by the reference numeral 10 is attached to the automobile seat assembly which is movably mounted through a shaft 19 on brackets 12, 12 secured on a vehicle floor 11. A manual lever 13 of the adjustable seat supporting assembly 10 is swingably mounted on the bracket 12. The numeral 14 denotes a link which is carried on a seat 15 of the seat assembly at one end thereof and on the adjustable seat supporting assembly 10 at other end thereof. Therefore, the operation of the adjustable seat supporting assembly 10 by means of the manual lever 13 causes the movement of the seat assembly through the link 14 as will be hereinafter explained in more detail, to the position indicated by a chain - dotted line from the position indicated by a solid line and vice versa.

The seat assembly is provided with a seat reclining assembly 16 adapted for adjusting the inclination of a back rest 17 with respect to the seat 15 of the seat assembly. Such adjusting movement of the seat reclining assembly 16 is conducted by a manual lever 18.

The first embodiment of the adjustable seat supporting assembly 10 is explained in detail with reference to FIGS. 2-6.

The brackets 12, 12 are arranged parallel to each other and provided with holes 29 through which the shaft 19 (FIG. 1) passes to mount the seat 15 thereon. The seat 15 is thus swingable to the fixed brackets 12, 12. Pivotally carried by the brackets 12, 12 is a shaft 23 to one end of which a latch member 26 generally fan - shaped is fixedly mounted. The latch member 26 is provided with notches 26a adapted into and out of engagement with an inward projected pin 27 which is fixed on the front end of one of the brackets 12, 12. The shaft 23 is received at one end thereof by a horizontally elongated hole 24 on the bracket 12. The movement of the shaft 23 along the elongated hole 24 will guide the latch member 26 to and out of engagement of the pin 27. The manual lever 13 pivoted to the bracket 12 through means of pin 22 is provided with vertically crooked or arcuate elongated hole 25 to receive the shaft 23. The movement of the shaft 23 along the elongated hole 25 will effect the engagement or disengagement of the latch member 26 with the pin 27. One end of the link 14 is pivoted to the seat 15 by a bolt 33' while the other end thereof is pivoted to the latch member 26 by a bolt 33. The swinging movement of the seat 15 around the shaft 19 may be corresponded to the rotational movement of the latch member 26 due to the pivotal connection of the link 14 therebetween. A helical retracting spring 28 is provided between the lever 13 and the bracket 12 for urging the lever 13 to move to the counter - clockwise direction around the pin 22.

A connecting lever 30 is secured to the other end of the shaft 23. Pivoted to the connecting lever 30 is a link 31 to which the set 15 is in turn pivotally mounted. Thus, the rotational displacement of the latch member 26 is transmitted to the seat 15 through connecting plate 30 and the link 31 as through the link 14. A washer 32 is provided at each end of the shaft 23 thereby preventing the axial withdrawal thereof.

Figure 4:
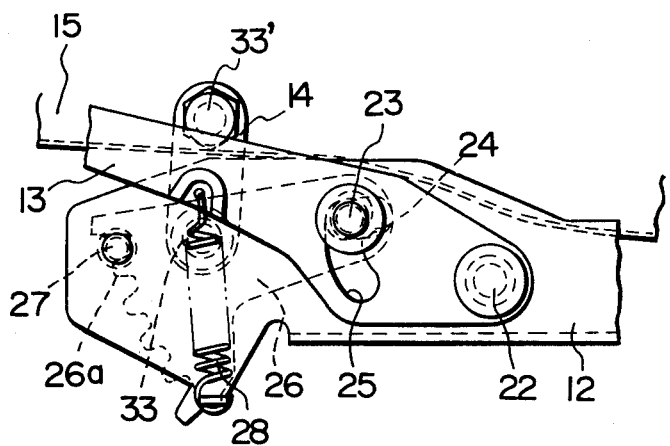
FIGS. 4-6 are side views of the first embodiment each showing the operational stage thereof.

In FIG. 4 the seat 15 is positioned in the lowest position by engagement of the most upper notch 26a of the latch member 26 with the pin 27. The shaft 23 is being brought to engagement with the upper end of the elongated hole 25 and with the left end of the elongate hole 24. The handle lever 13 is in the rest position by the exerting force of spring 28.

Figure 5:
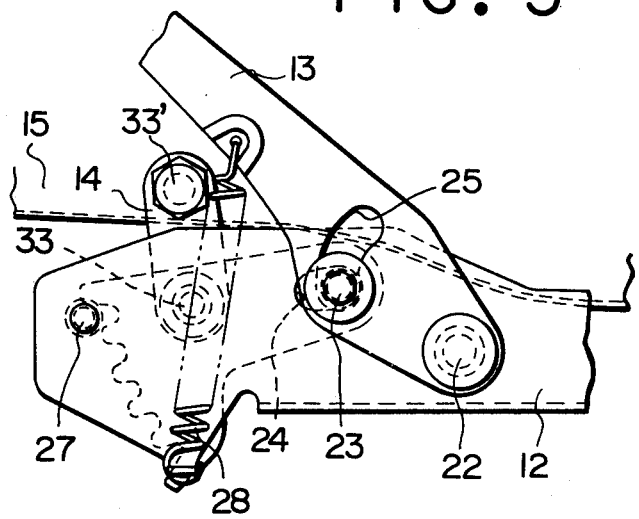
Figure 6:
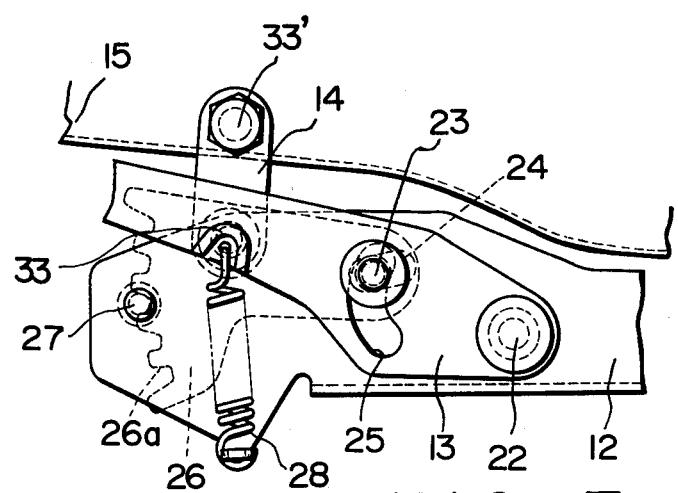

When the seat 15 is to be lifted up, the handle lever 13 is rotated in the clockwise direction around the pin 22 against the spring 28. The shaft 23 is, therefore, moved down relative to the elongated hole 25 and moved right relative to the elongated hole 24 as illustrated in FIG. 5. That is, the latch member 26 as well as the pin 23 is moved right to release from the pin 27. The engagement of the seat 15 with the bracket 12 is thus released. When the seat 15 is moved up to its desired degree, the latch member 26 as well as the shaft 23 is rotated in the clockwise direction due to the connection of the seat 15 and the latch member 26 through the link 14. Accordingly, the relative position of the latch member 26 to the pin 27 is changed and another notch 26a on the latch member 26 is engageable with the pin 27. The return of the lever 13 causes the relative movement of the shaft 23 to the left so that the shaft 23 engages the upper end of the elongated hole 25 and with the left end of the elongated hole 24. The selected notch 26a on the latch member 26 is, as a consequence, engaged with the pin 27 to retain the desired position of the seat 15, as seen in FIG. 6. It will be apparent without detail explanation that the down movement of the seat 15 after operation of the manual lever 13 may get a lower seat position.

Figure 7:
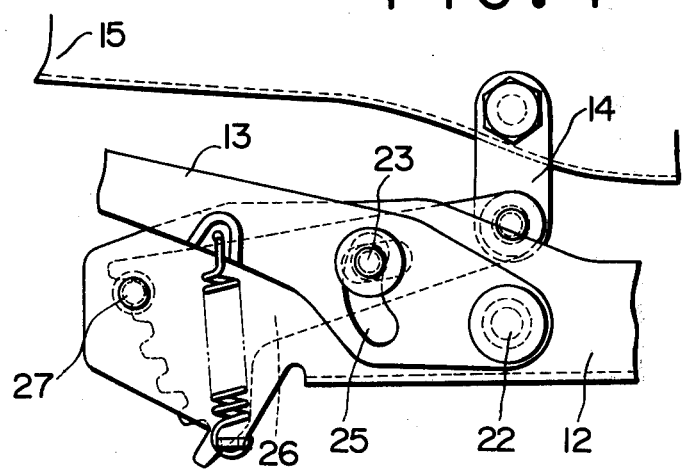
FIG. 7 is a view similar to FIG. 4 wherein the seat is in its lowest position but showing a second embodiment.

Referring now to FIG. 7 wherein the second embodiment of the invention is illustrated, the link 14 is pivotally mounted on the latch member 26 at the opposite side of the pin 27 relative to the shaft 23. That is, the latch member 26 is formed with the rear elongated portion to which the link 14 is pivoted. The other structure of the second embodiment is substantially the same as the first embodiment, so the further description will be omitted.

Figure 8:
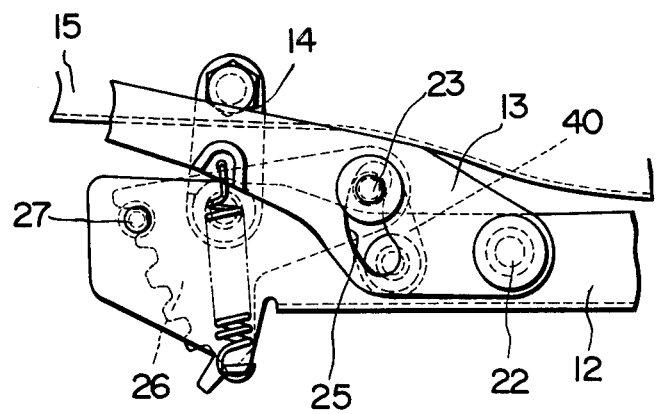
FIG. 8 is a view similar to FIG. 4 but showing a third embodiment.

In FIG. 8, the third embodiment of the invention is shown. A link plate 40 is provided between the bracket 12 and the shaft 23 in place of the horizontally elongated hole 24 of the first embodiment. The bracket 12 and the shaft 23 are pivotable on each end of the link plate 40 so that the same function and advantages as in the previous embodiments may be realized.

Figure 9:
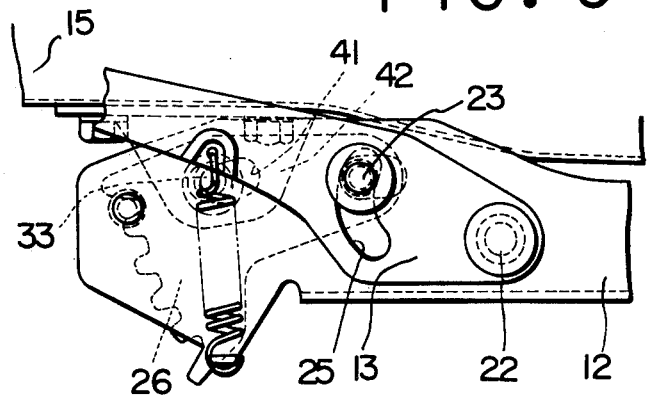
FIG. 9 is a view similar to FIG. 4 but showing a fourth embodiment.

Referring then to FIG. 9, the fourth embodiment of the present invention is shown. A bracket plate 42 provided with an elongated slot 41 is secured to the seat 15 in place of the link 14 of the first embodiment. The pivot pin 33 is movably received within the elongated slot 41.

Figure 10:
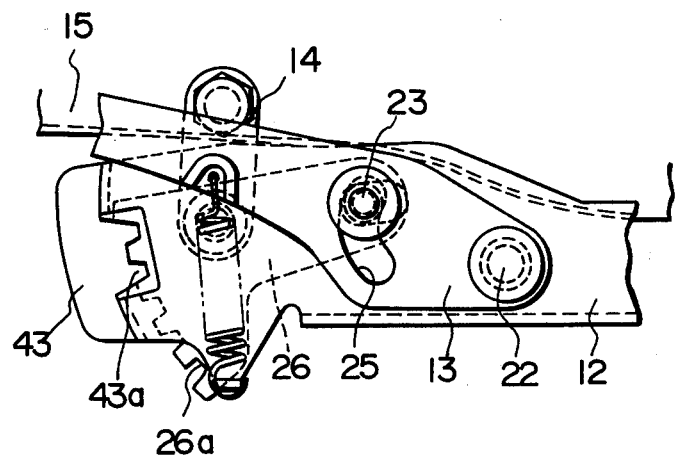
FIG. 10 is a view similar to FIG. 4 but showing a fifth embodiment.

In FIG. 10 wherein the fifth embodiment is illustrated a detent plate 43 is fixed to the bracket 12 in place of the pin 27. The detent plate 43 is provided with finger portions 43a for engagement with the notches 26a on the latch member 26.

Figure 11:
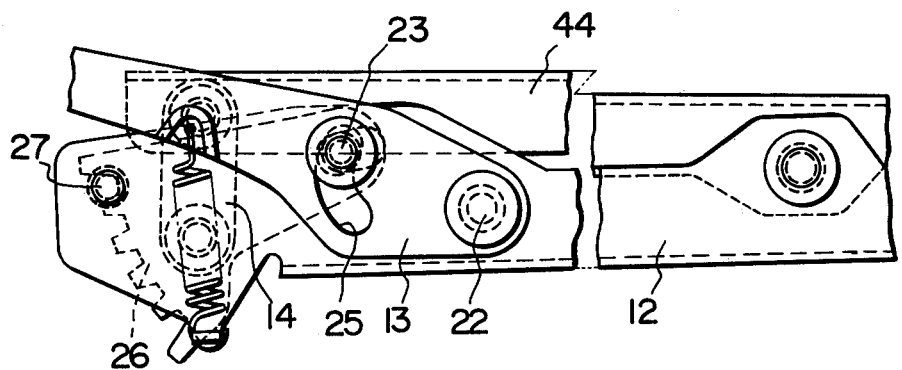
FIG. 11 is a view similar to FIG. 4 but showing a sixth embodiment.

Referring last to FIG. 11, the sixth embodiment of the present invention is represented. A bracket 44 is provided to secure the seat, not shown, thereon. One end of the bracket 44 is pivoted to the bracket 12 while the other end thereof is pivoted to the link 14.

Obviously, many modifications and variations of the invention are possible in light of the above teachings. For instance, the adjustable seat supporting assembly 10 may be attached additionally to the rear side of the seat 15 as well as to the front side thereof as in the foregoing embodiments. The provision of the assemblies 10 at the front and rear sides of the seat 15 may adjust the seat position more finely. In addition, the manual lever 13 may be mounted on the seat 15 in place of the bracket 12. Furthermore, the arrangement of the latch member and the detent may be replaced to each other without altering the gist of the present invention. Therefore, it is to be understood that within the scope of the appended claims, the invention may be practiced otherwise than as specifically described.

What is claimed is:

1. In an automobile seat assembly having a set swingably mounted on longitudinally extending brackets which are secured to an automobile floor in spaced relation with each other,
    an adjustable seat-supporting assembly mounted on said brackets, comprising:
    a shaft mounted at each end thereof on said brackets,
    guide means for providing fore and aft movement of said shaft,
    a latch member fixedly secured to said shaft adjacent one of said brackets, said member including notch means thereon, and said seat being operatively connected to said latch member for movement therewith,
    detent means fixedly secured to said one of said brackets and positioned for selectable engagement by said notch means;
    a manual lever mounted on said one of said brackets for pivotal movement between unactuated and actuated positions,
    cam means on said lever cooperating with said guide means for moving said shaft with the latch member secured thereto; wherein the pivotal movement of said lever disengages and engages said notch means with said detent means; and
    resilient means interconnecting said lever and said one bracket for urging said lever toward the unactuated position.

2. An assembly as claimed in claim 1 wherein said guide means comprises a horizontally elongated hole and said cam means comprises an arcuate elongated hole, said shaft being movably fitted within said elongated holes.

3. An assembly as claimed in claim 1 wherein a link member is pivotally mounted at its one end on said seat and at its other end on said latch member, to thereby interconnect said seat and said latch member.

4. An assembly as claimed in claim 1 wherein said detent means is a pin projecting from said one bracket.

5. An assembly as claimed in claim 1 wherein said means for urging said lever comprises a helical retracting spring provided between said manual lever and said one bracket.

6. An assembly as claimed in claim 3 wherein said link member is mounted on said latch member between said detent means and said shaft.

7. An assembly as claimed in claim 3 wherein said link member is mounted on said latch member at the opposite side of said shaft with respect to said detent means.

8. An assembly as claimed in claim 3 further comprising an additional bracket for securing said seat thereon, one end of said additional bracket being pivoted on said one bracket while the other end thereof is pivoted on said link member.

9. An assembly as claimed in claim 1 wherein said guide means comprises a link plate pivotally mounted at one end thereof on said one bracket and at the other end thereof on said shaft.

10. An assembly as claimed in claim 1 wherein a bracket plate provided with an elongated slot is secured to said seat, and a pin pivoted on said latch member is movably received within said elongated slot for interconnecting said seat and said latch member.

11. An assembly as claimed in claim 1 wherein said detent means is a plate provided with finger portions engageable with said notch means.

* * * * *